(12) United States Patent
Imaizumi

(10) Patent No.: US 10,545,042 B2
(45) Date of Patent: Jan. 28, 2020

(54) FUEL CONSUMPTION MEASUREMENT SYSTEM OF WORK VEHICLE AND FUEL CONSUMPTION MEASUREMENT METHOD OF WORK VEHICLE

(71) Applicant: Komatsu Ltd., Tokyo (JP)

(72) Inventor: Masaaki Imaizumi, Tokyo (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 16/097,387

(22) PCT Filed: Jun. 25, 2018

(86) PCT No.: PCT/JP2018/024040
§ 371 (c)(1),
(2) Date: Oct. 29, 2018

(87) PCT Pub. No.: WO2018/159862
PCT Pub. Date: Sep. 7, 2018

(65) Prior Publication Data
US 2019/0390993 A1 Dec. 26, 2019

(51) Int. Cl.
*G01F 9/00* (2006.01)
*F02D 29/02* (2006.01)
*F02D 45/00* (2006.01)

(52) U.S. Cl.
CPC .............. *G01F 9/001* (2013.01); *F02D 29/02* (2013.01); *F02D 45/00* (2013.01); *F02D 2200/0625* (2013.01)

(58) Field of Classification Search
CPC .......... G01F 9/001; F02D 45/00; F02D 29/02; F02D 2200/0625
See application file for complete search history.

(56) References Cited

U.S. PATENT DOCUMENTS 7,274,987 B2 9/2007 Ishiguro
2005/0209771 A1 9/2005 Ishiguro

FOREIGN PATENT DOCUMENTS

DE 102015206373 A1 10/2015
JP 56-041214 Y2 9/1981
JP 56-164921 A 12/1981
(Continued)

OTHER PUBLICATIONS

International Search Report dated Jul. 17, 2018, issued for PCT/JP2018/024040.

*Primary Examiner* — Xiao En Mo
(74) *Attorney, Agent, or Firm* — Locke Lord LLP

(57) ABSTRACT

A fuel consumption measurement system of a work vehicle includes a first fuel data calculation unit configured to calculate first fuel data related to fuel consumption, based on a fuel injection amount injected to an engine, a second fuel data calculation unit configured to calculate second fuel data related to fuel consumption, based on a change amount of a fuel amount in a fuel tank, a correction coefficient calculation unit configured to calculate a correction coefficient based on the first fuel data and the second fuel data, a correction coefficient determination unit configured to determine whether the correction coefficient falls within a prescribed range, a fuel consumption data calculation unit configured to calculate fuel consumption data indicating a fuel consumption rate, based on the correction coefficient determined to fall within the prescribed range, and the first fuel data, and an output unit configured to output the fuel consumption data.

12 Claims, 5 Drawing Sheets

(56) References Cited

FOREIGN PATENT DOCUMENTS

| | | |
|---|---|---|
| JP | S58-122434 A | 7/1983 |
| JP | 4-10013 B2 | 2/1992 |
| JP | 2006-219989 A | 8/2006 |
| JP | 2006-242896 A | 9/2006 |
| JP | 2012-036872 A | 2/2012 |
| JP | 2017-32570 A | 2/2017 |
| JP | 6167979 B2 | 7/2017 |
| WO | 03/095821 A1 | 11/2003 |

FUEL CONSUMPTION MEASUREMENT SYSTEM OF WORK VEHICLE AND FUEL CONSUMPTION MEASUREMENT METHOD OF WORK VEHICLE

FIELD

The present invention relates to a fuel consumption measurement system of a work vehicle and a fuel consumption measurement method of a work vehicle.

BACKGROUND

There is a known a technology of displaying a fuel consumption rate (fuel consumption) of an engine in real time on a display device mounted on a passenger vehicle.

CITATION LIST

Patent Literature

Patent Literature 1: Japanese Patent Application Laid-Open No. 2015-200616 A

SUMMARY

Technical Problem

Also in a work vehicle, it is desired to measure fuel consumption of an engine in real time and highly accurately. In a work of a work vehicle, in many cases, the work vehicle frequently repeats the driving and stop of a service machine, and frequently repeats traveling and stop. Thus, there is a high possibility that a drive state of the engine of the work vehicle frequently changes. In other words, a fuel injection amount injected to the engine frequently changes according to service content of the work vehicle. In addition, an engine control device for controlling the engine outputs a fuel injection command to a fuel injection device, but it is difficult for the fuel injection device to inject fuel in the same amount as a fuel injection amount indicated by the fuel injection command. Accordingly, even if fuel consumption is tried to be obtained by accumulating the fuel injection amount itself that is indicated by the fuel injection command, due to the difficulty in sensing of a fuel injection amount changing frequently, and limitation on response performance of the fuel injection device, there is a possibility that only fuel consumption with bad accuracy can be measured as fuel consumption of the work vehicle.

The object of an aspect of the present invention is to suppress deterioration in fuel consumption measurement accuracy of a work vehicle.

Solution to Problem

According to an aspect of the present invention, a fuel consumption measurement system of a work vehicle, comprises: a first fuel data calculation unit configured to calculate first fuel data related to fuel consumption, based on a fuel injection amount injected to an engine; a second fuel data calculation unit configured to calculate second fuel data related to fuel consumption, based on a change amount of a fuel amount in a fuel tank; a correction coefficient calculation unit configured to calculate a correction coefficient based on the first fuel data and the second fuel data; a correction coefficient determination unit configured to determine whether the correction coefficient falls within a prescribed range; and a fuel consumption data calculation unit configured to calculate fuel consumption data indicating a fuel consumption rate, based on the correction coefficient determined to fall within the prescribed range, and the first fuel data.

Advantageous Effects of Invention

According to an aspect of the present invention, deterioration in fuel consumption measurement accuracy of a work vehicle can be suppressed.

DESCRIPTION OF EMBODIMENTS

An embodiment according to the present invention will be described below with reference to the drawings. Nevertheless, the present invention is not limited to this. Components in the embodiment to be described below can be appropriately combined. In addition, some of components are not used in some cases.

[Work Vehicle]

Figure 1:
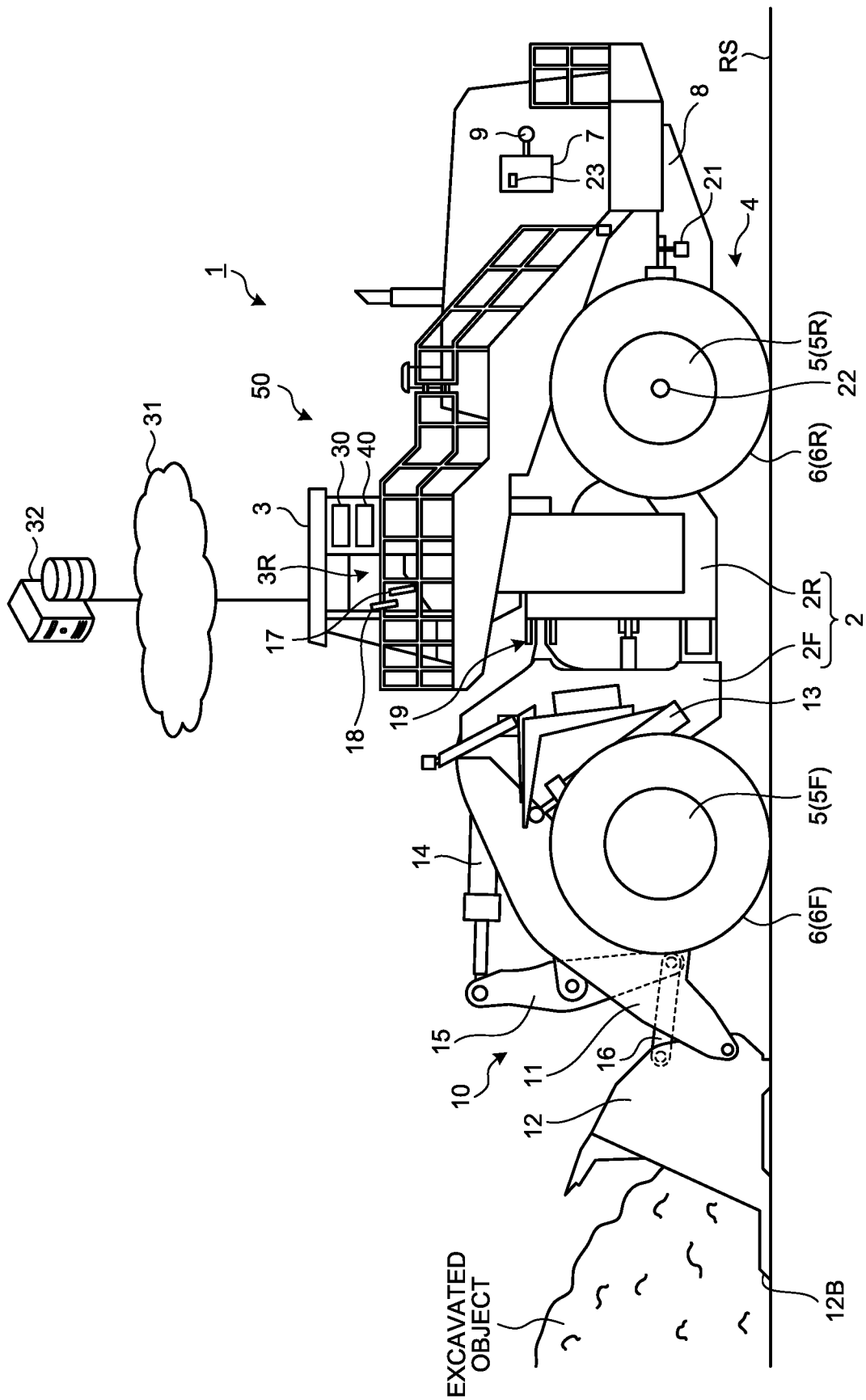
FIG. 1 is a side view illustrating a work vehicle according to an embodiment.

FIG. 1 is a side view illustrating a work vehicle 1 according to the present embodiment. In the present embodiment, the work vehicle 1 is a wheel loader 1, which is one type of an articulated work vehicle. The wheel loader 1 loads an excavated object scooped by a bucket 12, onto a transporter vehicle, or discharges the excavated object to a predetermined discharge location.

As illustrated in FIG. 1, the wheel loader 1 includes a vehicle body 2, a cab 3, a travel apparatus 4, an engine 7, a fuel tank 8, an oil pressure pump 9, a service machine 10, a fuel sensor 21, a speed sensor 22, a communication device 30, and a fuel consumption measurement system 50.

The vehicle body 2 includes a vehicle body anterior part 2F and a vehicle body posterior part 2R. The cab 3 is supported on the vehicle body posterior part 2R. A driver's cabin 3R is provided in the cab 3. The wheel loader 1 is driven by an operator who has got onto the driver's cabin 3R.

The engine 7, the fuel tank 8, and the oil pressure pump 9 are mounted on the vehicle body 2. The engine 7 includes a diesel engine. Fuel stored in the fuel tank 8 is supplied to the engine 7. The fuel tank 8 is disposed on the lower part of the vehicle body posterior part 2R. The engine 7 includes an injector 23. The injector 23 injects fuel to the engine 7. By fuel being supplied to the engine 7, the engine 7 is driven. The oil pressure pump 9 is connected to the engine 7. By the engine 7 being driven, the oil pressure pump 9 is driven. Operating oil discharged from the oil pressure pump 9 is supplied to a boom cylinder 13 and a bucket cylinder 14 for moving the service machine 10, a steering cylinder for swinging the wheel loader 1, and the like.

The fuel sensor 21 detects a fuel amount M indicating an amount of fuel stored in the fuel tank 8. The fuel amount M may be volume of fuel, or may be weight of fuel. The fuel amount M indicates a fuel remaining amount in the fuel tank 8. By detecting the height of a surface of fuel stored in the fuel tank 8, the fuel sensor 21 detects the fuel amount M stored in the fuel tank 8. The fuel sensor 21 includes a float floating in fuel stored in the fuel tank 8, and a detector that detects a position of the float. As a detection method of the detector, at least one of a printing resistance method, a winding resistance method, and an electrostatic capacitance method is exemplified.

The travel apparatus 4 supports the vehicle body 2. The travel apparatus 4 includes an articulating mechanism 19 and wheels 5. The articulating mechanism 19 couples the vehicle body anterior part 2F and the vehicle body posterior part 2R so as to be bendable. The articulating mechanism 19 includes a steering cylinder. By the steering cylinder extending and contracting, the vehicle body 2 bends. By the vehicle body 2 bends, the wheel loader 1 swings. The wheels 5 rotate by driving power generated by the engine 7. Tires 6 are attached to the wheels 5. The wheels 5 include left and right front wheels 5F supported on the vehicle body anterior part 2F, and left and right rear wheels 5R supported on the vehicle body posterior part 2R. The tires 6 include front tires 6F attached to the front wheels 5F, and rear tires 6R attached to the rear wheels 5R. By the wheels 5 rotating, the wheel loader 1 travels on a road surface RS. The speed sensor 22 detects travel speed of the wheel loader 1.

The service machine 10 is supported on the vehicle body anterior part 2F. The service machine 10 includes a boom 11 swingably coupled to the vehicle body 2, the bucket 12 swingably coupled to the boom 11, a bell crank 15, and a link 16.

The boom 11 vertically swings by driving power generated by the boom cylinder 13. The boom cylinder 13 operates by operating oil discharged from the oil pressure pump 9. One end portion of the boom cylinder 13 is coupled to the vehicle body 2. Another end portion of the boom cylinder 13 is coupled to the boom 11.

The bucket 12 is a work tool having a tip portion 12B including a blade edge. The bucket 12 is disposed anterior to the front tires 6F. The bucket 12 is coupled to a tip portion of the boom 11. The bucket 12 swings by driving power generated by the bucket cylinder 14. The bucket cylinder 14 operates by operating oil discharged from the oil pressure pump 9. A center portion of the bell crank 15 is rotatably coupled to the boom 11. One end portion of the bucket cylinder 14 is coupled to the vehicle body 2. Another end portion of the bucket cylinder 14 is coupled to one end portion of the bell crank 15. Another end portion of the bell crank 15 is coupled to the bucket 12 via the link 16.

In the driver's cabin 3R, a driver seat on which an operator is seated, an operating device 17 to be operated by the operator, and a display device 18 are provided. The operating device 17 includes an accelerator pedal, a brake pedal, a steering lever, a forward/backward changeover switch, and a service machine operating lever.

By operating the accelerator pedal, the brake pedal, the steering lever, and the forward/backward changeover switch of the operating device 17, the operator can execute driving, braking, swinging, and forward/backward changeover of the travel apparatus 4.

By operating the accelerator pedal and the brake pedal of the operating device 17, the operator can execute driving, braking, and travel speed adjustment of the travel apparatus 4. By operating the steering lever of the operating device 17, the operator can execute swinging of the wheel loader 1, and by operating a forward/backward changeover lever, the operator can execute changeover of forward/backward movement of the wheel loader 1.

By operating the service machine operating lever of the operating device 17, the operator can execute actuation of the boom cylinder 13 and actuation of the bucket cylinder 14. By the boom cylinder 13 extending and contracting, the boom 11 performs an upward operation or a downward operation. By the bucket cylinder 14 extending and contracting, the bucket 12 performs a tilt operation or a dump operation.

The display device 18 displays display data. The display device 18 includes a flat-panel display such as a liquid crystal display (LCD) or an organic electroluminescence display (OELD).

The communication device 30 can communicate with an external server 32 of the work vehicle 1 via a communication network 31. As the communication network 31, at least one of a Local Area Network (LAN), internet, a mobile telephone communication network, and a satellite communication network is exemplified. The server 32 includes a computer system provided on the outside of the work vehicle 1.

[Fuel Consumption Measurement System]

Figure 2:
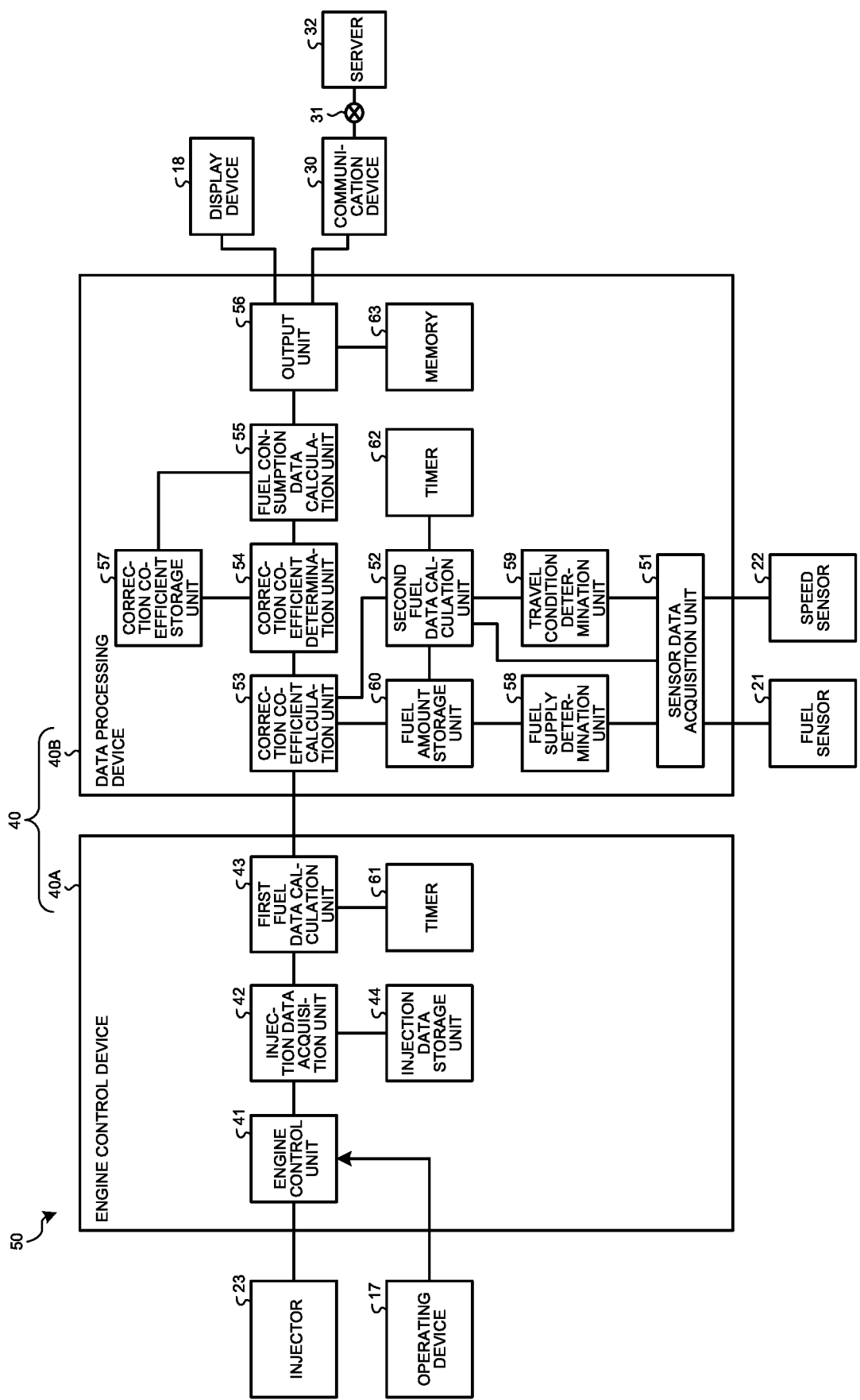
FIG. 2 is a functional block diagram illustrating a fuel consumption measurement system according to an embodiment.

FIG. 2 is a functional block diagram illustrating the fuel consumption measurement system 50 according to the present embodiment. The fuel consumption measurement system 50 measures a fuel consumption rate (fuel consumption) of the work vehicle 1. In the work vehicle 1, fuel consumption indicates a fuel consumption amount per unit time, and a unit is [L/h].

The fuel consumption measurement system 50 includes a control apparatus 40. The control apparatus 40 includes a computer system. The control apparatus 40 is mounted on the vehicle body 2. The control apparatus 40 controls the work vehicle 1. The control apparatus 40 includes an engine control device 40A that executes control of the engine 7, and a data processing device 40B that executes calculation of fuel consumption of the work vehicle 1, control of the display device 18, output of fuel consumption data, and the like.

The engine control device 40A includes an engine control unit 41, an injection data acquisition unit 42, a first fuel data calculation unit 43, an injection data storage unit 44, and a timer 61.

The data processing device 40B includes a sensor data acquisition unit 51, a second fuel data calculation unit 52, a correction coefficient calculation unit 53, a correction coefficient determination unit 54, a fuel consumption data calculation unit 55, an output unit 56, a correction coefficient storage unit 57, a fuel supply determination unit 58, a travel condition determination unit 59, a fuel amount storage unit 60, a timer 62, and a memory 63.

The engine control unit 41 outputs a control command for controlling the injector 23. The engine control unit 41 outputs a control command based on an operation amount of the accelerator pedal of the operating device 17. The control command output from the engine control unit 41 includes a control command for controlling a fuel injection amount injected to the engine 7, and a control command for controlling the number of fuel injections per unit time. The fuel injection amount indicates weight of fuel injected in one injection operation of the injector 23, and a unit is [mg/ stroke]. The number of fuel injections indicates the number of injection operations of the injector 23 that are executed per unit time, and a unit is [stroke/s].

The injection data acquisition unit 42 acquires injection data related to fuel injection performed by the injector 23. The injection data includes a fuel injection amount and the number of fuel injections. In addition, the injection data includes fuel specific weight and an injector correction coefficient. The fuel specific weight indicates specific weight of fuel, and a unit is [mg/mm$^3$]. The fuel specific weight is known data that can be derived from physicality data of fuel stored in the fuel tank 8, and is stored in the injection data storage unit 44. The fuel injection amount acquired by the injection data acquisition unit 42 is weight of fuel injected in one injection operation of the injector 23. Based on the fuel specific weight, a fuel injection amount represented in weight [mg] is converted into a fuel injection amount represented in volume [mm$^3$]. In other words, based on the fuel specific weight, volume [mm$^3$/stroke] of fuel injected in one injection operation of the injector 23 is calculated as a fuel injection amount.

Figure 3:
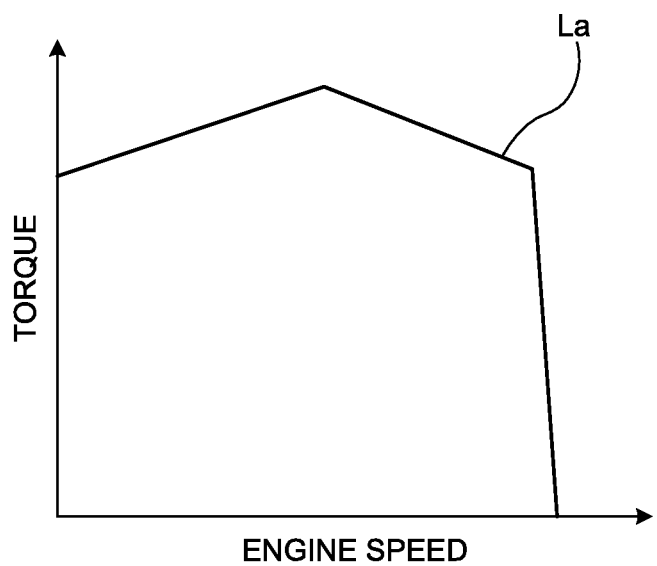
FIG. 3 is a diagram illustrating a torque line diagram of an engine according to an embodiment.

FIG. 3 is a diagram illustrating a torque line diagram of the engine 7 according to the present embodiment. An upper limit torque characteristic of the engine 7 is prescribed by a maximum output torque line La. The engine control unit 41 controls the injector 23 based on the upper limit torque characteristic and engine target output. The engine control unit 41 adjusts a fuel injection amount with respect to the engine 7 so that engine speed and torque of the engine 7 do not exceed the maximum output torque line La.

In the present embodiment, there is prescribed an injector correction coefficient for correcting a relationship between a fuel injection amount, engine speed and torque so that prescribed engine speed and torque are generated in the engine 7 when fuel is injected from the injector 23 in a prescribed fuel injection amount. For example, the injector correction coefficient is a fixed value unambiguously defined at the time of shipment of the wheel loader 1 in a factory that produces the wheel loader 1, and is stored in the injection data storage unit 44.

Based on the injection data, the first fuel data calculation unit 43 calculates first fuel data D1 related to fuel consumption. The first fuel data calculation unit 43 calculates the first fuel data D1 at least based on a fuel injection amount injected to the engine 7.

The first fuel data D1 includes average fuel consumption Daf1 indicating an average fuel consumption rate in an operating time T of the engine 7 that is provided between prescribed start time point ta and end time point tb. In the present embodiment, based on fuel specific weight, the first fuel data calculation unit 43 converts a fuel injection amount represented in weight [mg/stroke], into a fuel injection amount represented in volume [mm$^3$/stroke]. The timer 61 can measure the operating time T. In the case of calculating the average fuel consumption Daf1, the first fuel data calculation unit 43 can calculate the first fuel data D1 indicating the average fuel consumption Daf1 [L/h] in the operating time T, based on a fuel injection amount [mm$^3$/ stroke], the number of fuel injections [stroke/s], and the operating time T.

In addition, the first fuel data D1 may include an accumulated fuel consumption amount Dcf1 in the operating time T of the engine 7 that is provided between the prescribed start time point ta and end time point tb. In the case of calculating the accumulated fuel consumption amount Dcf1, the first fuel data calculation unit 43 can calculate the first fuel data D1 indicating the accumulated fuel consumption amount Dcf1 in the operating time T, based on a fuel injection amount, the number of fuel injections, and the operating time T.

The sensor data acquisition unit 51 acquires detection data of the fuel sensor 21 and detection data of the speed sensor 22. The fuel sensor 21 detects the fuel amount M in the fuel tank 8 at a prescribed cycle, and outputs detection data to the sensor data acquisition unit 51. The speed sensor 22 detects travel speed V of the work vehicle 1 at a prescribed cycle, and outputs detection data to the sensor data acquisition unit 51.

The second fuel data calculation unit 52 calculates second fuel data D2 related to fuel consumption, based on the detection data acquired by the sensor data acquisition unit 51. The second fuel data calculation unit 52 calculates the second fuel data D2 at least based on a change amount of the fuel amount M in the fuel tank 8 that has been detected by the fuel sensor 21.

The second fuel data D2 includes fuel consumption Daf2 indicating a fuel consumption rate in the operating time T of the engine 7 that is provided between the prescribed start time point ta and end time point tb. The timer 61 can measure the operating time T. In the case of measuring the fuel consumption Daf2, the second fuel data calculation unit 52 can calculate the second fuel data D2 indicating the fuel consumption Daf2 in the operating time T, based on the respective fuel amounts M in the fuel tank 8 at the start time point ta and the end time point tb of the operating time T, and the operating time T. In other words, the second fuel data calculation unit 52 can calculate the fuel consumption Daf2 [L/h] based on a difference [L] between a fuel amount Ma in the fuel tank 8 at the start time point ta of the operating time T, and a fuel amount Mb in the fuel tank 8 at the end time point tb of the operating time T, and the operating time T [h].

In addition, the second fuel data D2 may include a fuel consumption amount Dcf2 in the operating time T of the engine 7 that is provided between the prescribed start time point ta and end time point tb. In the case of calculating the fuel consumption amount Dcf2, the second fuel data calculation unit 52 can calculate the second fuel data D2 indicating the fuel consumption amount Dcf2, based on the respective fuel amounts M in the fuel tank 8 at the start time point ta and the end time point tb of the operating time T.

The correction coefficient calculation unit 53 calculates a correction coefficient kt to be used in the calculation of fuel consumption data Df, based the first fuel data D1 and the second fuel data D2. The correction coefficient calculation unit 53 calculates, as the correction coefficient kt, a ratio between the first fuel data D1 and the second fuel data D2. When the first fuel data D1 is the average fuel consumption Daf1 in the operating time T of the engine 7, and the second fuel data D2 is the fuel consumption Daf2 in the operating time T of the engine 7, the correction coefficient calculation unit 53 calculates, as the correction coefficient kt, [Daf1/ Daf2] being a ratio between the average fuel consumption consumption rate Daf1 and the fuel consumption consumption rate Daf2. When the first fuel data D1 includes the accumulated fuel consumption amount Dcf1 in the operating time T of the engine 7, and the second fuel data D2 includes the fuel consumption amount Dcf2 in the operating time T of the engine 7, the correction coefficient calculation unit 53 calculates, as the correction coefficient kt, [Dcf1/Dcf2] being a ratio between the accumulated fuel consumption amount Dcf1 and the fuel consumption amount Dcf2.

An example of a calculation method of the correction coefficient kt will be described. Hereinafter, it is assumed that the first fuel data D1 is the average fuel consumption Daf1, and the second fuel data D2 is the fuel consumption Daf2.

When the fuel amount M at the start time point ta of the operating time T is the fuel amount Ma, and the fuel amount M at the end time point tb which is a time point at which the operating time T has elapsed thereafter is the fuel amount Mb, the second fuel data D2 indicating the fuel consumption Daf2 is represented by Formula (1).

$$D2=(Ma-Mb)/T \quad (1)$$

The first fuel data D1 indicating the average fuel consumption Daf1 is represented by Formula (2) based on the accumulated fuel consumption amount Dcf1 in the operating time T.

$$D1=Dcf1/T \quad (2)$$

The correction coefficient kt is a ratio between the first fuel data D1 and the second fuel data D2, and is represented by Formula (3).

$$kt=D2/D1 \quad (3)$$

The correction coefficient determination unit 54 determines whether the correction coefficient kt falls within a prescribed range R. In the present embodiment, the prescribed range R is 0.8 or more and 1.2 or less. In other words, the correction coefficient determination unit 54 determines whether the obtained correction coefficient Kt satisfies a condition of [0.8≤kt≤1.2]. For example, when the first fuel data D1 (the average fuel consumption Daf1 or the accumulated fuel consumption amount Dcf1) calculated by the first fuel data calculation unit 43, and the second fuel data D2 (the fuel consumption Daf2 or the fuel consumption amount Dcf2) match, the correction coefficient kt is 1, and satisfies the condition of falling within the prescribed range R. When the first fuel data D1 (the average fuel consumption Daf1 or the accumulated fuel consumption amount Dcf1) calculated by the first fuel data calculation unit 43 and the second fuel data D2 (the fuel consumption Daf2 or the fuel consumption amount Dcf2) are different, or the obtained correction coefficient kt falls below 0.8 or exceeds 1.2, the correction coefficient kt falls outside the prescribed range R, and does not satisfy the condition.

The fuel consumption data calculation unit 55 calculates the fuel consumption data Df indicating a fuel consumption rate, based on the correction coefficient kt determined to fall within the prescribed range R, and the first fuel data D1. The fuel consumption data calculation unit 55 calculates the fuel consumption data Df by multiplying the first fuel data D1 calculated by the first fuel data calculation unit 43, by the correction coefficient kt.

The output unit 56 outputs the fuel consumption data Df calculated by the fuel consumption data calculation unit 55. The output unit 56 outputs the fuel consumption data Df to the display device 18 mounted on the wheel loader 1. In the present embodiment, after converting the fuel consumption data Df into display data displayable by the display device 18, the output unit 56 outputs the display data to the display device 18.

In addition, the output unit 56 transmits the fuel consumption data Df to the external server 32 of the work vehicle 1. The output unit 56 outputs the fuel consumption data Df to the server 32 via the communication device 30. In addition, the output unit 56 may output the fuel consumption data Df to the readable/writable memory 63, and the memory 63 may accumulate the fuel consumption data Df. In this case, the output unit 56 may read out the fuel consumption data Df from the memory 63 at a preset timing, and output the fuel consumption data Df to the server 32 via the communication device 30.

The correction coefficient storage unit 57 stores the correction coefficient kt determined by the correction coefficient determination unit 54 to fall within the prescribed range R. When the correction coefficient kt calculated by the correction coefficient calculation unit 53 is determined by the correction coefficient determination unit 54 to fall outside the prescribed range R, the fuel consumption data calculation unit 55 calculates the fuel consumption data Df based on the correction coefficient kt stored in the correction coefficient storage unit 57, and the first fuel data D1 calculated by the first fuel data calculation unit 43. When the correction coefficient kt calculated by the correction coefficient calculation unit 53 is determined by the correction coefficient determination unit 54 to fall within the prescribed range R, the fuel consumption data calculation unit 55 calculates the fuel consumption data Df based on the correction coefficient kt calculated by the correction coefficient calculation unit 53, and the first fuel data D1 calculated by the first fuel data calculation unit 43.

The fuel supply determination unit 58 determines whether fuel has been supplied to the fuel tank 8, based on the detection data of the fuel sensor 21. When it is determined, based on the detection data of the fuel sensor 21, that the fuel amount M stored in the fuel tank 8 increases, the fuel supply determination unit 58 determines that fuel has been supplied to the fuel tank 8. When it is determined that the fuel amount M stored in the fuel tank 8 decreases, the fuel supply determination unit 58 determines that fuel has not been supplied to the fuel tank 8. When it is determined by the fuel supply determination unit 58 that fuel has not been supplied to the fuel tank 8, the correction coefficient calculation unit 53 calculates the correction coefficient kt. When it is determined by the fuel supply determination unit 58 that fuel has been supplied to the fuel tank 8, the correction coefficient calculation unit 53 does not calculate the correction coefficient kt.

The travel condition determination unit 59 determines whether the wheel loader 1 satisfies a prescribed travel condition. The travel condition includes a state in which a state in which the travel speed V of the wheel loader 1 is equal to or less than a speed threshold has continued for a prescribed time. In the present embodiment, the speed threshold is 1 [km/h], and the prescribed time is 60[s]. In other words, the travel condition includes a state in which a state in which the travel speed V of the wheel loader 1 is equal to or less than 1 [km/h] has continued for 60 seconds. In a situation in which the wheel loader 1 repeats moving start and stop, because a liquid surface of fuel stored in the fuel tank 8 largely surges and waves due to inertial force, the fuel sensor 21 cannot stably measure the fuel amount M. On the other hand, a state in which the wheel loader 1 satisfies the prescribed travel condition becomes a state in which inertial force decrease, waving of the liquid surface of fuel stored in the fuel tank 8 stops, and the liquid surface is stable.

The second fuel data calculation unit 52 calculates the second fuel data D2 based on a change amount of the fuel amount M in the fuel tank 8 that has been acquired by the sensor data acquisition unit 51 when the wheel loader 1 satisfies the prescribed travel condition. When a prescribed time elapses in a state in which the work vehicle 1 travels at low speed, or a state in which the work vehicle 1 is stopped, the travel condition determination unit 59 determines that the liquid surface of fuel in the fuel tank 8 is stable. The second fuel data calculation unit 52 calculates the second fuel data D2 based on the fuel amount M detected by the fuel sensor 21 when the liquid surface of fuel in the fuel tank 8 is stable.

The fuel amount storage unit 60 stores the fuel amount M that has been acquired by the sensor data acquisition unit 51 when it is determined by the fuel supply determination unit 58 that fuel has not been supplied to the fuel tank 8.

[Fuel Consumption Measurement Method]

Figure 5:
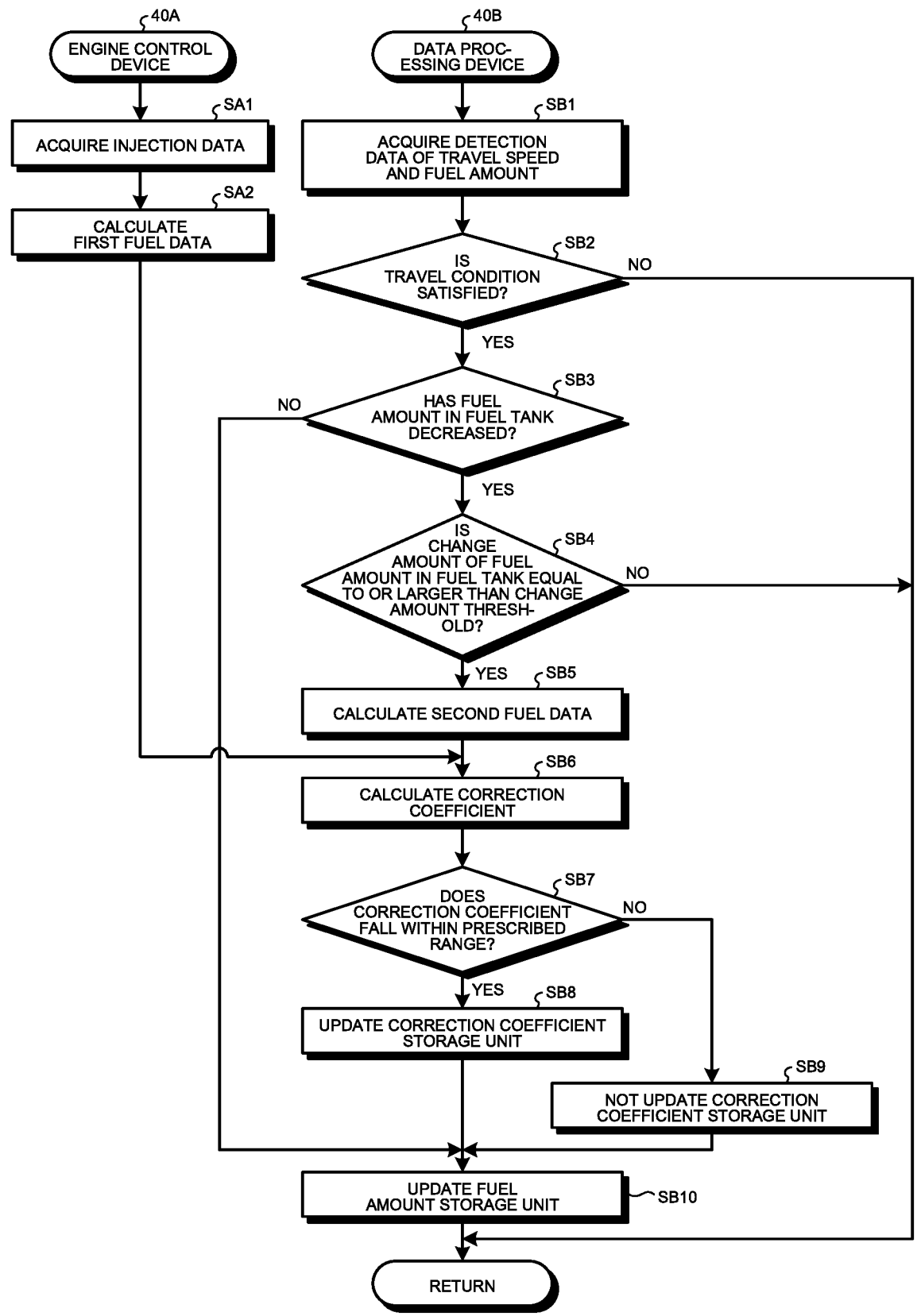
FIG. 5 is a flowchart illustrating the fuel consumption measurement method according to an embodiment.
Figure 6:
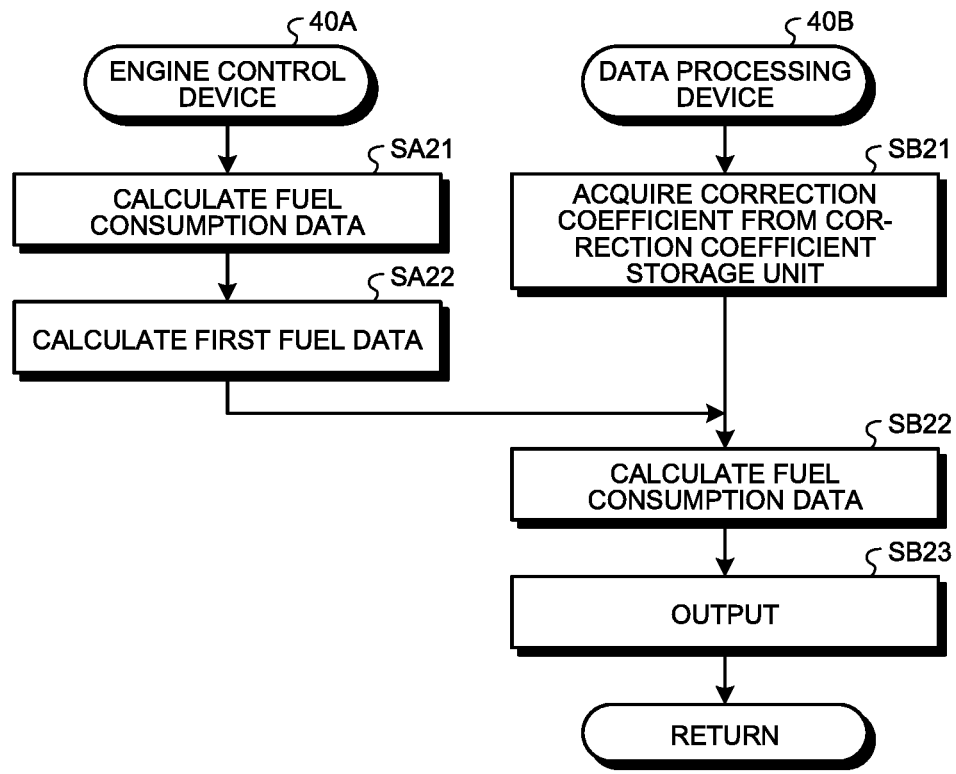
FIG. 6 is a flowchart illustrating the fuel consumption measurement method according to an embodiment.

Next, a fuel consumption measurement method according to the present embodiment will be described with reference to FIGS. 4, 5, and 6. Each of FIGS. 4, 5, and 6 is a flowchart illustrating a fuel consumption measurement method according to the present embodiment.

Figure 4:
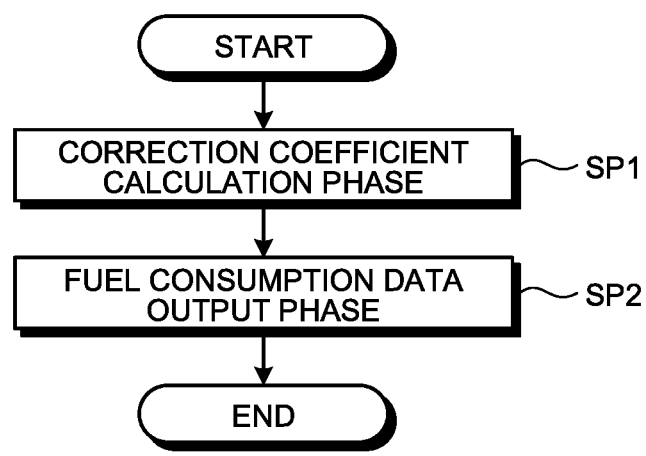
FIG. 4 is a flowchart illustrating a fuel consumption measurement method according to an embodiment.

As illustrated in FIG. 4, in the present embodiment, the fuel consumption measurement method includes a correction coefficient calculation phase SP1 of calculating the correction coefficient kt, and a fuel consumption data output phase SP2 of calculating the fuel consumption data Df based on the correction coefficient kt calculated in the correction coefficient calculation phase SP1. FIG. 5 is a flowchart illustrating the correction coefficient calculation phase SP1. FIG. 6 is a flowchart illustrating the fuel consumption data output phase SP2.

The correction coefficient calculation phase SP1 will be described with reference to FIG. 5.

In the engine control device 40A, the injection data acquisition unit 42 acquires, from the engine control unit 41, injection data including a fuel injection amount and the number of injections. In addition, the injection data acquisition unit 42 acquires, from the injection data storage unit 44, injection data including fuel specific weight and an injector correction coefficient (Step SA1).

Based on the injection data, the first fuel data calculation unit 43 calculates the first fuel data D1. In the present embodiment, the first fuel data calculation unit 43 calculates, as the first fuel data D1, the accumulated fuel consumption amount Dcf1 in the operating time T of the engine 7 that is provided between the prescribed start time point ta and end time point tb (Step SA2).

Based on fuel specific weight, the first fuel data calculation unit 43 converts a fuel injection amount represented in weight [mg/stroke], into a fuel injection amount represented in volume [mm$^3$/stroke]. The timer 61 can measure the operating time T. In the case of calculating the accumulated fuel consumption amount Dcf1, the first fuel data calculation unit 43 can calculate the first fuel data D1 indicating the accumulated fuel consumption amount Dcf1 in the operating time T, based on a fuel injection amount [mm$^3$/stroke], the number of fuel injections [stroke/s], and the operating time T.

In the data processing device 40B, the sensor data acquisition unit 51 acquires detection data of the travel speed V of the wheel loader 1 from the speed sensor 22, and acquires detection data of the fuel amount M in the fuel tank 8 from the fuel sensor 21 (Step SB1).

The travel condition determination unit 59 determines whether the wheel loader 1 satisfies the prescribed travel condition, based on the detection data of the travel speed V of the wheel loader 1 (Step SB2).

The travel condition includes a state in which a state in which the travel speed V of the wheel loader 1 is equal to or less than 1 [km/h] being the speed threshold has continued for 60 [s] being the prescribed time.

When it is determined in Step SB2 that the wheel loader 1 satisfies the travel condition (Step SB2: Yes), the fuel supply determination unit 58 determines whether fuel has been supplied to the fuel tank 8, based on the detection data of the fuel amount M in the fuel tank 8. In other words, the fuel supply determination unit 58 determines whether the fuel amount M stored in the fuel tank 8 has decreased from that in the previous detection (Step SB3).

When it is determined in Step SB3 that the fuel amount M stored in the fuel tank 8 increases (Step SB3: No), the fuel supply determination unit 58 determines that fuel has been supplied to the fuel tank 8. When it is determined that the fuel amount M stored in the fuel tank 8 decreases, the fuel supply determination unit 58 determines that fuel has not been supplied to the fuel tank 8.

When it is determined in Step SB3 that the fuel amount M stored in the fuel tank 8 decreases (Step SB3: Yes), the fuel supply determination unit 58 determines whether a change amount of the fuel amount M that indicates a difference between the fuel amount M stored in the fuel amount storage unit 60, and the fuel amount M that has been acquired in Step SB1, and obtained when it is determined in Step SB2 that the travel condition is satisfied, and it is determined in Step SB3 that fuel has not been supplied to the fuel tank 8, is equal to or larger than a change amount threshold C (Step SB4).

In the present embodiment, the change amount threshold C is 156 [L]. In the following description, the fuel amount M stored in the fuel amount storage unit 60 will be appropriately referred to as a previous fuel amount Ma, and the fuel amount M that has been acquired in Step SB1, and obtained when it is determined in Step SB2 that the travel condition is satisfied, and it is determined in Step SB3 that fuel has not been supplied to the fuel tank 8, will be appropriately referred to as a current fuel amount Mb. The previous fuel amount Ma corresponds to the fuel amount Ma measured at the start time point ta of the operating time T of the wheel loader 1. The current fuel amount Mb corresponds to the fuel amount Mb measured at the end time point tb of the operating time T of the wheel loader 1.

When it is determined in Step SB4 that a change amount of the fuel amount M is equal to or larger than the change amount threshold C (Step SB4: Yes), the second fuel data calculation unit 52 calculates second fuel data based on the change amount of the fuel amount M in the fuel tank 8 (Step SB5).

In the present embodiment, the second fuel data calculation unit 52 calculates, as the second fuel data D2, the fuel consumption Daf2 in the operating time T of the engine 7 that is provided between the prescribed start time point ta and end time point tb. The second fuel data calculation unit 52 can calculate the fuel consumption Daf2 [L/h] based on a difference [L] between the previous fuel amount Ma indicating the fuel amount M in the fuel tank 8 at the start time point ta of the operating time T, and the current fuel amount Mb indicating the fuel amount M in the fuel tank 8 at the end time point tb of the operating time T, and the operating time T [h]. In other words, the second fuel data calculation unit 52 calculates the second fuel data D2 indicating the fuel consumption Daf2, based on Formula (1) described above.

The correction coefficient calculation unit 53 calculates the correction coefficient kt based on the first fuel data D1 indicating the accumulated fuel consumption amount Dcf1 that has been calculated in Step SA2, and the second fuel data D2 indicating the fuel consumption Daf2 that has been calculated in Step SB5 (Step SB6).

In other words, the correction coefficient calculation unit 53 calculates the correction coefficient kt based on Formulae (2) and (3) described above.

The correction coefficient determination unit 54 determines whether the correction coefficient kt calculated in Step SB6 falls within the prescribed range R (Step SB7).

As described above, in the present embodiment, the prescribed range R is 0.8 or more and 1.2 or less. The correction coefficient determination unit 54 determines whether the obtained correction coefficient Kt satisfies the condition of [$0.8 \leq kt \leq 1.2$].

When it is determined in Step SB7 that the correction coefficient kt falls within the prescribed range R (Step SB7: Yes), the correction coefficient determination unit 54 stores the correction coefficient kt determined to fall within the prescribed range R, into the correction coefficient storage unit 57.

The correction coefficient kt already stored in the correction coefficient storage unit 57 is updated with the new correction coefficient kt that has been calculated in Step SB6, and determined in Step SB7 to fall within the prescribed range R (Step SB8).

When it is determined in Step SB7 that the correction coefficient kt does not fall within the prescribed range R (Step SB7: No), the correction coefficient determination unit 54 does not update the correction coefficient kt stored in the correction coefficient storage unit 57 (Step SB9).

In other words, a previous correction coefficient kta indicating the correction coefficient kt calculated based on the previous fuel amount Ma is maintained in the correction coefficient storage unit 57.

When it is determined in Step SB3 that fuel has been supplied to the fuel tank 8 (Step SB3: No), or when it is determined in Step SB3 that fuel has not been supplied to the fuel tank 8 and it is determined in Step SB4 that the fuel amount has decreased from the previous fuel amount Ma by more than the change amount threshold C, the previous fuel amount Ma already stored in the fuel amount storage unit 60 is updated with the current fuel amount Mb (Step SB10).

When it is determined in Step SB2 that the wheel loader 1 does not satisfy the travel condition (Step SB2: No), or when it is determined in Step SB4 that the change amount of the fuel amount M is less than the change amount threshold C (Step SB4: No), the processing returns to the processing in Step SB1, and the correction coefficient calculation phase SP1 is repeated.

Next, the fuel consumption data output phase SP2 will be described with reference to FIG. 6.

In the engine control device 40A, the injection data acquisition unit 42 acquires, from the engine control unit 41, injection data including a fuel injection amount and the number of injections. In addition, the injection data acquisition unit 42 acquires, from the injection data storage unit 44, injection data including fuel specific weight and an injector correction coefficient (Step SA21).

Based on the injection data, the first fuel data calculation unit 43 calculates the first fuel data D1. In the present embodiment, the first fuel data calculation unit 43 calculates, as the first fuel data D1, the average fuel consumption Daf1 in the operating time T of the engine 7 that is provided between the prescribed start time point ta and end time point tb (Step SA22).

The fuel consumption data calculation unit 55 acquires, from the correction coefficient storage unit 57, the correction coefficient kt determined to fall within the prescribed range R (Step SB21).

When it is determined in Step SB9 illustrated in FIG. 5 that the correction coefficient kt falls within the prescribed range R, a current correction coefficient ktb indicating the latest correction coefficient kt calculated based on the current fuel amount Mb is stored in the correction coefficient storage unit 57. The fuel consumption data calculation unit 55 acquires the current correction coefficient ktb stored in the correction coefficient storage unit 57. On the other hand, when it is determined in Step SB9 illustrated in FIG. 5 that the correction coefficient kt does not fall within the prescribed range R, the correction coefficient storage unit 57 is not updated (Step SB13), and the previous correction coefficient kta calculated based on the previous fuel amount Ma is stored in the correction coefficient storage unit 57. The fuel consumption data calculation unit 55 acquires the previous correction coefficient kta stored in the correction coefficient storage unit 57.

The fuel consumption data calculation unit 55 calculates the fuel consumption data Df based on the correction coefficient kt acquired from the correction coefficient storage unit 57, and the first fuel data D1 calculated in Step SA22 (Step SB22).

The fuel consumption data calculation unit 55 calculates the fuel consumption data Df by multiplying the first fuel data D1 by the correction coefficient kt.

The output unit 56 outputs the fuel consumption data Df calculated by the fuel consumption data calculation unit 55, to the display device 18 and the server 32 (Step SB23). Furthermore, the output unit 56 may output the fuel consumption data Df to the memory 63, and the memory 63 may accumulate the fuel consumption data Df.

[Computer System]

Figure 7:
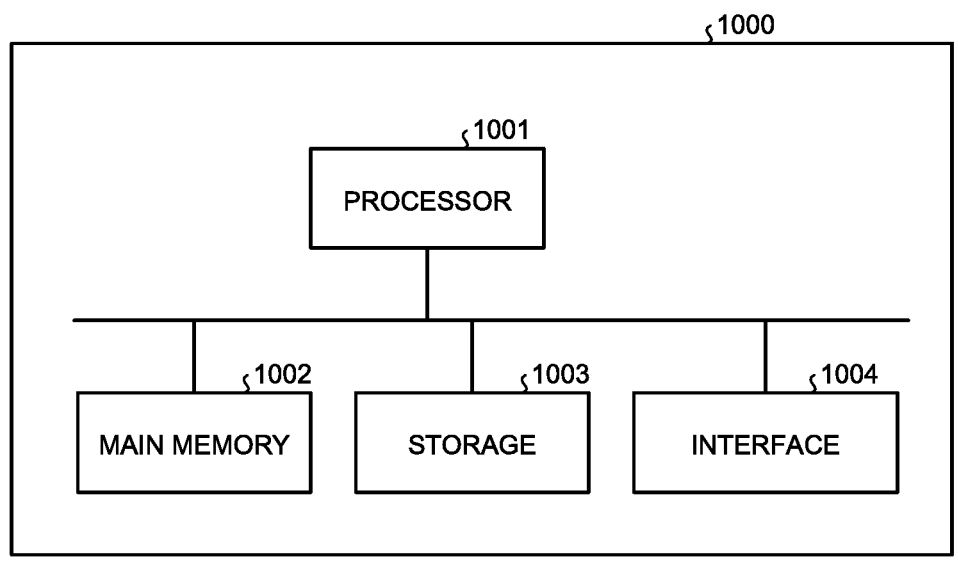
FIG. 7 is a block diagram illustrating a computer system according to an embodiment.

FIG. 7 is a block diagram illustrating a computer system 1000 according to the present embodiment. Each of the engine control device 40A, the data processing device 40B, and the server 32 that have been described above includes the computer system 1000. The computer system 1000 includes a processor 1001 such as a Central Processing Unit (CPU), a main memory 1002 including a nonvolatile memory such as a Read Only Memory (ROM), and a volatile memory such as a Random Access Memory (RAM), a storage 1003, and an interface 1004 including an input/output circuit. The functions of the engine control device 40A, the data processing device 40B, and the server 32 that have been described above are stored in the storage 1003 as programs. The processor 1001 reads out the programs from the storage 1003, loads the programs onto the main memory 1002, and executes the above-described processing according to the programs. In addition, the programs may be delivered to the computer system 1000 via a network.

[Effects]

As described above, according to the present embodiment, in the correction coefficient calculation phase SP1, the first fuel data D1 is calculated based on a fuel injection amount injected to the engine 7. The second fuel data D2 is calculated based on a change amount (decrease amount) of the fuel amount M in the fuel tank 8. The first fuel data D1 and the second fuel data D2 are compared, and when the first fuel data D1 and the second fuel data D2 are equal or proximate, that is to say, when a ratio between the first fuel data D1 and the second fuel data D2 is 1 or proximate to 1 (when falling within the prescribed range R), the ratio between the first fuel data D1 and the second fuel data D2 is adopted as the correction coefficient kt. In the fuel consumption data output phase SP2, accurate fuel consumption data Df can be obtained in real time by correcting the first fuel data D1 calculated based on the fuel injection amount injected to the engine 7, using the correction coefficient kt calculated in the correction coefficient calculation phase SP1.

For example, even if the correction coefficient kt is calculated based on the fuel amount M measured when the wheel loader 1 satisfies the travel condition, when the fuel tank 8 of the wheel loader 1 is inclined, there is a high possibility that the liquid surface of the stored fuel is also largely inclined, and it becomes difficult for the fuel sensor 21 to detect an accurate fuel amount M. When the fuel amount M detected by the fuel sensor 21 is inaccurate, there is a high possibility that the second fuel data D2 is also inaccurate.

In the present embodiment, the first fuel data D1 and the second fuel data D2 are compared, and when the first fuel data D1 and the second fuel data D2 are equal or proximate, the correction coefficient kt is calculated so as to be usable for obtaining fuel consumption. This can suppress the occurrence of such a failure that the correction coefficient kt is calculated based on inaccurate second fuel data D2.

In the present embodiment, when the first fuel data D1 and the second fuel data D2 are not proximate, that is to say, when a ratio between the first fuel data D1 and the second fuel data D2 does not fall within the prescribed range R, by correcting the first fuel data D1 based on the previous correction coefficient kta stored in the correction coefficient storage unit 57, deterioration in measurement accuracy that is caused when the fuel consumption data Df is measured in real time can be suppressed.

Other Embodiments

In addition, in the above-described embodiment, the work vehicle 1 is assumed to be a wheel loader. The work vehicle 1 may be a dump truck that frequently repeats traveling and stop in a work. In addition, the work vehicle 1 may be at least one of a bulldozer, a motor grader, an engine-type forklift, and an excavator that frequently repeat driving and driving stop of a service machine in a work, or frequently repeat traveling and stop.

REFERENCE SIGNS LIST

1 WHEEL LOADER (WORK VEHICLE)
2 VEHICLE BODY
2F VEHICLE BODY ANTERIOR PART
2R VEHICLE BODY POSTERIOR PART
3 CAB
3R DRIVER'S CABIN
4 TRAVEL APPARATUS
5 WHEEL
5F FRONT WHEEL
5R REAR WHEEL
6 TIRE
6F FRONT TIRE
6R REAR TIRE
7 ENGINE
8 FUEL TANK
9 OIL PRESSURE PUMP
10 WORK DEVICE
11 BOOM
12 BUCKET
12B TIP PORTION
13 BOOM CYLINDER
14 BUCKET CYLINDER
15 BELL CRANK
16 LINK
17 OPERATING DEVICE
18 DISPLAY DEVICE
19 ARTICULATING MECHANISM
21 FUEL SENSOR
22 SPEED SENSOR
23 INJECTOR
30 COMMUNICATION DEVICE
31 COMMUNICATION NETWORK
32 SERVER (COMPUTER SYSTEM)
40 CONTROL APPARATUS
40A ENGINE CONTROL DEVICE
40B DATA PROCESSING DEVICE
41 ENGINE CONTROL UNIT
42 INJECTION DATA ACQUISITION UNIT
43 FIRST FUEL DATA CALCULATION UNIT
50 FUEL CONSUMPTION MEASUREMENT SYSTEM
51 SENSOR DATA ACQUISITION UNIT
52 SECOND FUEL DATA CALCULATION UNIT
53 CORRECTION COEFFICIENT CALCULATION UNIT
54 CORRECTION COEFFICIENT DETERMINATION UNIT
55 FUEL CONSUMPTION DATA CALCULATION UNIT
56 OUTPUT UNIT
57 CORRECTION COEFFICIENT STORAGE UNIT
58 FUEL SUPPLY DETERMINATION UNIT
59 TRAVEL CONDITION DETERMINATION UNIT
60 FUEL AMOUNT STORAGE UNIT
61 TIMER
62 TIMER
63 MEMORY
D1 FIRST FUEL DATA
C CHANGE AMOUNT THRESHOLD
Daf1 AVERAGE FUEL CONSUMPTION
Dcf1 ACCUMULATED FUEL CONSUMPTION AMOUNT
D2 SECOND FUEL DATA
Daf2 FUEL CONSUMPTION
Dcf2 FUEL CONSUMPTION AMOUNT
kt CORRECTION COEFFICIENT
kta PREVIOUS CORRECTION COEFFICIENT
ktb CURRENT CORRECTION COEFFICIENT
M FUEL AMOUNT
Ma FUEL AMOUNT (PREVIOUS FUEL AMOUNT)
Mb FUEL AMOUNT (CURRENT FUEL AMOUNT)
R PRESCRIBED RANGE
T OPERATING TIME
V TRAVEL SPEED

The invention claimed is:

1. A fuel consumption measurement system of a work vehicle, comprising:
a first fuel data calculation unit configured to calculate first fuel data related to fuel consumption, based on a fuel injection amount injected to an engine;
a second fuel data calculation unit configured to calculate second fuel data related to fuel consumption, based on a change amount of a fuel amount in a fuel tank;
a correction coefficient calculation unit configured to calculate a correction coefficient based on the first fuel data and the second fuel data;
a correction coefficient determination unit configured to determine whether the correction coefficient falls within a prescribed range; and
a fuel consumption data calculation unit configured to calculate fuel consumption data indicating a fuel consumption rate, based on the correction coefficient determined to fall within the prescribed range, and the first fuel data.

2. The fuel consumption measurement system of a work vehicle according to claim 1, further comprising
a correction coefficient storage unit configured to store the correction coefficient determined to fall within the prescribed range,
wherein when it is determined that the correction coefficient calculated by the correction coefficient calculation unit does not fall within a prescribed range, the fuel consumption data calculation unit calculates the fuel consumption data based on the correction coefficient stored in the correction coefficient storage unit, and the first fuel data.

3. The fuel consumption measurement system of a work vehicle according to claim 1, further comprising
a travel condition determination unit configured to determine whether a work vehicle satisfies a prescribed travel condition,
wherein the second fuel data calculation unit is configured to calculate the second fuel data based on a change amount of a fuel amount in the fuel tank that has been acquired when the work vehicle satisfies the travel condition.

4. The fuel consumption measurement system of a work vehicle according to claim 3,
wherein the travel condition includes a state in which a state in which travel speed of the work vehicle is equal to or smaller than a speed threshold has continued for a prescribed time.

5. The fuel consumption measurement system of a work vehicle according to claim 1, further comprising
a fuel supply determination unit configured to determine whether fuel has been supplied to the fuel tank,
wherein when it is determined that fuel has not been supplied to the fuel tank, the correction coefficient calculation unit calculates the correction coefficient.

6. The fuel consumption measurement system of a work vehicle according to claim 1, further comprising
an output unit configured to output the fuel consumption data,
wherein the output unit is configured to output the fuel consumption data to a display device mounted on a work vehicle.

7. The fuel consumption measurement system of a work vehicle according to claim 1, further comprising
an output unit configured to output the fuel consumption data,
wherein the output unit is configured to transmit the fuel consumption data to an external computer system of a work vehicle.

8. The fuel consumption measurement system of a work vehicle according to claim 1,
wherein the second fuel data includes a fuel consumption rate in an operating time of the engine, and
wherein the second fuel data calculation unit is configured to calculate the second fuel data based on respective fuel amounts in the fuel tank at a start time point and an end time point of the operating time, and the operating time.

9. The fuel consumption measurement system of a work vehicle according to claim 8,
wherein the first fuel data includes an average fuel consumption rate in the operating time,
wherein the first fuel data calculation unit is configured to calculate the first fuel data based on the fuel injection amount, the number of fuel injections, and the operating time, and
wherein the correction coefficient calculation unit is configured to calculate, as the correction coefficient, a ratio between the first fuel data and the second fuel data.

10. The fuel consumption measurement system of a work vehicle according to claim 1,
wherein the second fuel data includes a fuel consumption amount in an operating time of the engine, and
wherein the second fuel data calculation unit is configured to calculate the second fuel data based on respective fuel amounts in the fuel tank at a start time point and an end time point of the operating time.

11. The fuel consumption measurement system of a work vehicle according to claim 10,
wherein first fuel data includes an accumulated fuel consumption amount in the operating time,
wherein the first fuel data calculation unit is configured to calculate the first fuel data based on the fuel injection amount, the number of fuel injections, and the operating time, and
wherein the correction coefficient calculation unit is configured to calculate, as the correction coefficient, a ratio between the fuel consumption amount and the accumulated fuel consumption amount.

12. A fuel consumption measurement method of a work vehicle, comprising:
calculating first fuel data related to fuel consumption, based on a fuel injection amount injected to an engine;
calculating second fuel data related to fuel consumption, based on a change amount of a fuel amount in a fuel tank;
calculating a correction coefficient based on the first fuel data and the second fuel data;
determining whether the correction coefficient falls within a prescribed range; and
calculating fuel consumption data indicating a fuel consumption rate, based on the correction coefficient determined to fall within the prescribed range, and the first fuel data.

* * * * *